United States Patent [19]

Chin

[11] Patent Number: 5,532,473
[45] Date of Patent: Jul. 2, 1996

[54] REFLECTION SHADOW SENSOR WITH LIGHT DIRECTING DIFFUSIVE SURFACE

[76] Inventor: Philip K. Chin, 813 W. William David Pkwy., Metairie, La. 70005

[21] Appl. No.: 326,652

[22] Filed: Oct. 20, 1994

Related U.S. Application Data

[63] Continuation-in-part of Ser. No. 100,488, Jul. 30, 1993, Pat. No. 5,389,777, which is a continuation-in-part of Ser. No. 955,932, Oct. 2, 1992, Pat. No. 5,376,785.

[51] Int. Cl.$^6$ ........................................................ H01J 3/14
[52] U.S. Cl. ............................. 250/214 PR; 250/559.17; 250/229
[58] Field of Search ........................ 250/214 PR, 221, 250/222.1, 227.21, 229, 231.13, 559.12, 559.14, 559.16, 559.17, 559.4; 341/13

[56] References Cited

U.S. PATENT DOCUMENTS

| | | | |
|---|---|---|---|
| 5,172,003 | 12/1992 | Nasu et al. | 250/559.17 |
| 5,376,785 | 12/1994 | Chin | 250/214 PR |
| 5,389,777 | 2/1995 | Chin | 250/214 PR |

*Primary Examiner*—Stephone Allen
*Attorney, Agent, or Firm*—Keaty & Keaty

[57] ABSTRACT

A reflective shadow sensor is disclosed for use in detecting the position of a moving object by directing a flow of light towards that object and detecting the amount of light reflected by a surface of the moving object.

29 Claims, 3 Drawing Sheets

REFLECTION SHADOW SENSOR WITH LIGHT DIRECTING DIFFUSIVE SURFACE

CROSS REFERENCE TO RELATED APPLICATIONS

This is a continuation in part of my application Ser. No. 100,488, filed on Jul. 30, 1993, now U.S. Pat. No. 5,389,777, entitled "Optical Displacement Sensor Utilizing Optical Diffusion And Reflection" (CIP), which is a continuation in part of my application Ser. No. 955,932, filed on Oct. 2, 1992, now U.S. Pat. No. 5,376,785, entitled "Optical Displacement Sensor Utilizing Optical Diffusion", now allowed, the full disclosure of both of which is incorporated by reference herein.

BACKGROUND OF THE INVENTION

This invention relates to an optical sensor for use in applications wherein accurate determination of the contours of an object are important. Many industries require precision in determination of a position of an object that passes on a conveyer or on some other moving platform in order to accurately determine the dimensions of the object and detect any non-compliance with a "master image." For example, copy machines and laser printers need to accurately track the position of the paper in its path through the machine, and to make sure that the printed image is placed at a precise location on the piece of paper. The same is true for mass printing operations, wherein newspapers, magazines and other paper products are developed. To achieve this purpose, various devices have been proposed, some of them utilizing optical sensors to perform the above operations.

The present invention relates to a type of sensor which utilizes reflected optical flow for determination of the precise parameters of an object, as well as accurate printing in the desired area of the paper sheet.

SUMMARY OF THE INVENTION

It is, therefore, an object of the present invention to provide an optical device utilizing a reflection sensor as a means of detecting parameters and location of an object.

It is another object of the present invention to provide a high accuracy, high sensitivity sensor, which is inexpensive to manufacture and has a large dynamic range.

It is a further object of the present invention to provide an optical sensor which is durable and highly reliable.

These and other objects of the present invention are achieved through a provision of an optical sensor which comprises a light emitting means having a light source connected in a light transferring relationship to a light pipe and a light receiving means having a light sensor mounted in a light transferring relationship with a light receiving pipe. The light emitting pipe and the light receiving pipe are formed with translucent faces which allow diffusion of light before it exits and enters the respective light pipes. The light emitting pipe and the light receiving pipe are mounted in a spaced-apart relationship to each other in such a manner that their diffusive translucent faces face in the same direction.

A light impermeable object moves and/or rotates in front of the diffusive translucent surfaces of the light emitting pipe and the light receiving pipe. When the light sensor emits a flow of light, that flow travels through the light emitting pipe, exits the translucent face and is at least partially reflected from the surface of the light impermeable object, or reflective object, such that that portion of light which is reflected from the surface of the object travels in the direction of the light receiving pipe.

The light flow reflected from the light impermeable object travels through the light receiving pipe to a light sensor which receives the data on the amount of light flow reflected from the object and transmits the data to an external computing means. Furthermore, by changing the shape of the translucent face, as well as allowing for the light pipes to move or rotate, the signal output curve can also be changed.

The reflective object can be a sheet of paper used in a printing operation, an object moving through a conveyor system, etc. The invention can also find its applications in robotic tactile operations, as a general displacement sensor, in virtual reality input devices, computer and arcade joysticks and input devices, artificial limbs and the like.

BRIEF DESCRIPTION OF THE DRAWINGS

Reference will now be made to the drawings, wherein like parts are designated by like numerals, and wherein.

DETAIL DESCRIPTION OF THE PREFERRED EMBODIMENT

Figure 1:
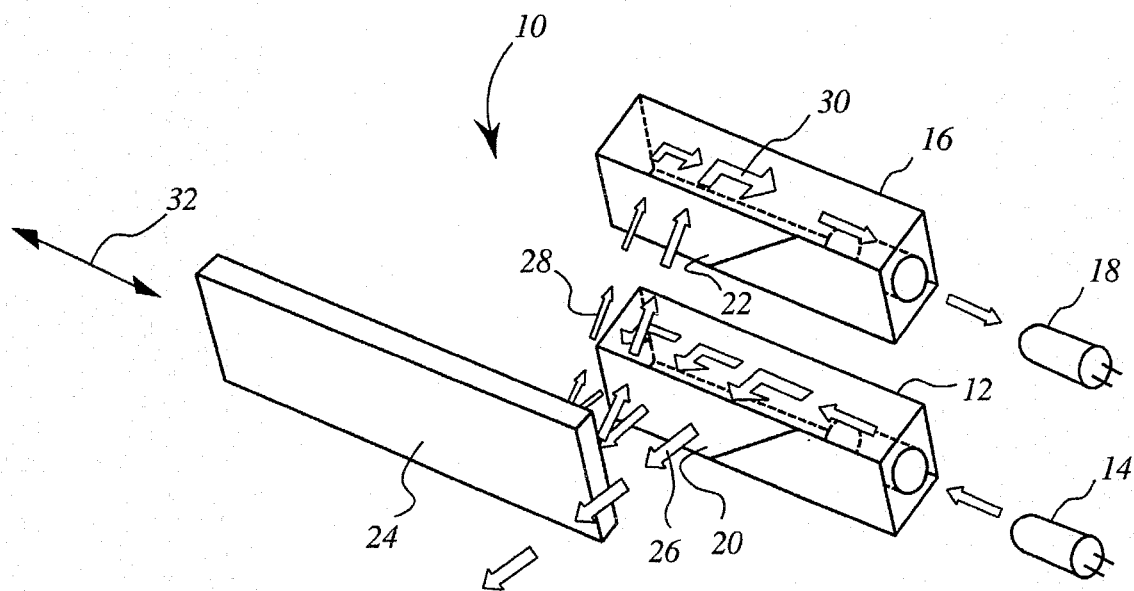
FIG. 1 is a schematic view of a reflective shadow sensor, wherein the reflective object moves parallel to translucent faces of the light pipes.

Turning now to the drawings in more detail, the device of the first embodiment of the present invention is designated by numeral 10 in FIG. 1. The sensor 10 comprises a first, light emitting pipe 12, which houses a light source 14 mounted within the light pipe 12, and a second, light receiving pipe 16 which is adapted to house a light sensor 18. The light pipes 12 and 16 are positioned in a spaced-apart relationship with each other, so that their light permeable faces 20 and 22, respectively, are oriented in one vertical plane. In some embodiments, it is also envisioned that the light pipes 12 and 16 can be so spaced from each other, that the light pipe 16 is located a distance slightly further away from a reflective object 24.

The reflective object 24 can be white or color paper, aluminum, plastic or any other object the dimensions of which need to be determined. The exterior surfaces of the light pipes 12 and 16 are made light impermeable, except for the portion of the faces, 20 and 22 which are formed translucent. The light source 14 positioned within the light pipe 12 emits a flow of light which travels through the emitter light pipe 12 towards the translucent face 20 and exits through that face in the direction of arrows 26. The light flow is diffused when it passes through the translucent face 20. Since the exterior surfaces of the emitter light pipe 12 are made light impermeable, the face 20 remains the only path through which the light flow can travel. By shaping the face 20, it is possible to control the output of the light flow from the light pipe 12.

As shown in FIG. 1, at least a part of the light flow reaches the light impermeable surface of the reflective object 24 and "bounces off", or reflects from the surface facing the translucent face 20 at an angle and further travels in the direction of arrows 28. This part of the light flow enters the translucent face 22 of the light receiving pipe 16 and travels through the light pipe 16 in the direction of arrows 30 until it reaches the light sensor 18. Similarly to the light pipe 12, the light pipe 16 has an exterior surface which is made light impermeable except for the diffusive translucent face 22. In this manner, the amount of light which reaches the sensor 18 can be controlled. The light source 14 can be an infrared light emitting diode, or other similar light emitting device, while the light sensor 18 can be an infrared phototransistor, or a similar device.

The reflective object 24 moves substantially parallel to the faces 20 and 22, as shown by directional arrows 32, so that intermittently greater or smaller part of the light flow is reflected from its surface. Depending on that amount of light, the precise parameters of the object 24, as well as the precise location of where the light flow strikes its surface, can be determined.

In order to make the exterior surfaces of the light pipes 12 and 16 light impermeable, they may be covered by a reflective adhesive film or metallic stickers in order to channel the light in the desired direction.

Figure 2:
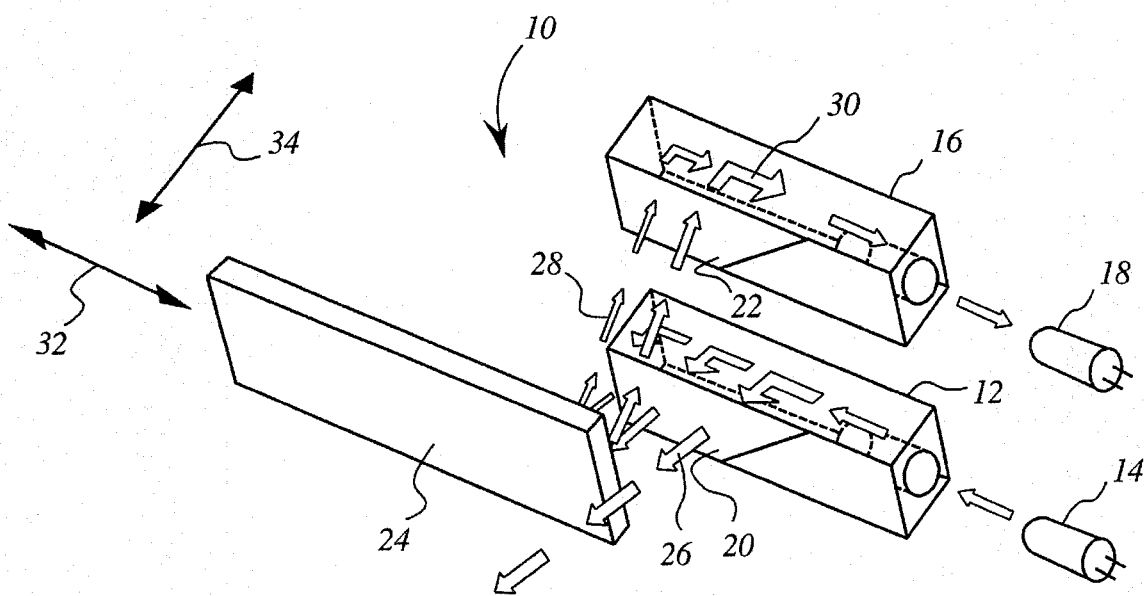
FIG. 2 is a schematic view of another embodiment of the present invention, wherein the reflective object moves both in the direction parallel to the translucent faces of the light pipes and in the direction perpendicular thereto.

Turning now to FIG. 2, the reflective shadow sensor device in accordance with the present invention is shown in use with a reflective object which moves not only in parallel relationship to the translucent faces 20 and 22 of the light emitter pipe 12 and the light receiving pipe 16, respectively, but also in the direction towards or away from the faces 20 and 22. This direction is schematically illustrated by arrow 34 in FIG. 2.

Similarly to the embodiment of FIG. 1, the light flow exits the translucent face 20 in the direction of arrows 26, reflects from the surface of the reflective object 24 and travels towards the light receiving pipe 16 in the direction of arrows 28. Once reaching the translucent face 22 of the receiving light pipe 16, the light flow changes its direction and moves substantially coaxially with the longitudinal axis of the light pipe 16 toward the light sensor 18, wherein the amount of light reflected from the object 24 is detected. The data output from the light sensor 18 of both embodiments of FIGS. 1 and 2 is then processed by an external computing source for receiving necessary data on the outer parameters of the object 24 or on the precise location where the light flow strikes the surface of the object 24.

Figure 3:
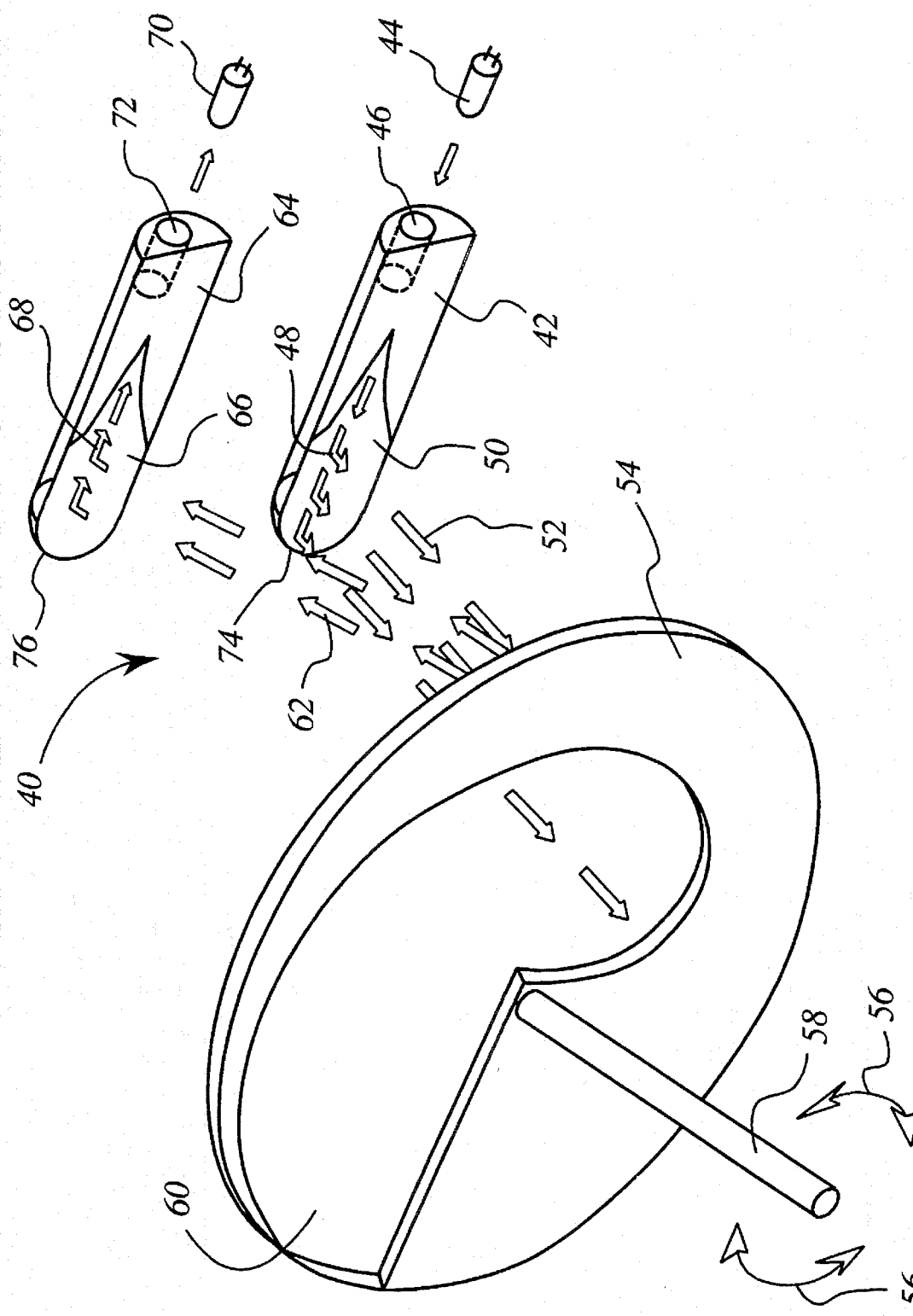
FIG. 3 is a schematic view of a rotational reflection shadow sensor utilizing a spiral reflective disc as a reflective object.

Turning now to FIG. 3, another embodiment of the reflective shadow sensor is shown. The shadow sensor 40 comprises a light emitting pipe 42 which houses a light source 44 within an opening 46 formed in one of the ends of the emitter light pipe 42. The light pipe 42 has a semi-circular cross-section and elongated body through which the light emitted by the source 44 travels in the direction of arrows 48.

A translucent face 50 is formed on at least a part of the flat surface of the emitter pipe 42, allowing the light flow to exit the light pipe body and travel in the direction of arrows 52 until it reaches a reflective object 54. The reflective object 54 can be formed as a rotational spiral light impermeable body which is rotated by application of torque from an external source of power in the direction of arrows 56. The rotational force is transmitted to a rod 58 which is secured adjacent a central portion of the object 54 to cause the disc shaped body 54 to rotate.

A window 60 is formed in the disc 54 allowing a light flow to pass therethrough. At least a part of that light flow strikes the light impermeable surface of the reflective object 54 and is reflected therefrom to travel in the direction of arrows 62 towards a light receiving pipe 64. The light receiving pipe 64, similarly to the light emitting pipe 42, is semi-circular in cross section and has a flat face, at least a portion of which is occupied by a translucent face 66.

The light flow that was reflected from the object 54 travels towards the surface 66 and enters the light pipe 64 through the translucent face 66. Inside the light pipe 64, the light flow changes its direction, as shown by arrows 68, and travels towards the light sensor 70 which is positioned inside the light pipe 64 within the opening 72 made therein.

The surfaces of the light pipes 42 and 64 not facing the reflective object 54 are formed outwardly convex, while at least one of the ends of the pipes, designated by numerals 74 and 76, is curved to further facilitate channeling of the light in the desired direction. Therefore, when the light flow moves from the light source 44 through the elongated body 42 in a substantially axial direction within the body, it reaches the end 74 and curves along the inner wall of the light pipe 42. Similarly, when the light flow reaches the face 66, it enters the light pipe 64 and curves along the inner wall of the end 76 to turn and travel in a substantially longitudinal axial direction towards the light sensor 70.

The faces 50 and 66 are shown irregularly shaped, and this irregular shape can be altered depending on the desired path through which the light is to travel and the curved output which is to be received in the sensor 70. The data received from the sensor 70, similarly to the data received from the sensors 18 of the embodiments shown in FIGS. 1 and 2, is further processed by an external computing device.

Figure 4:
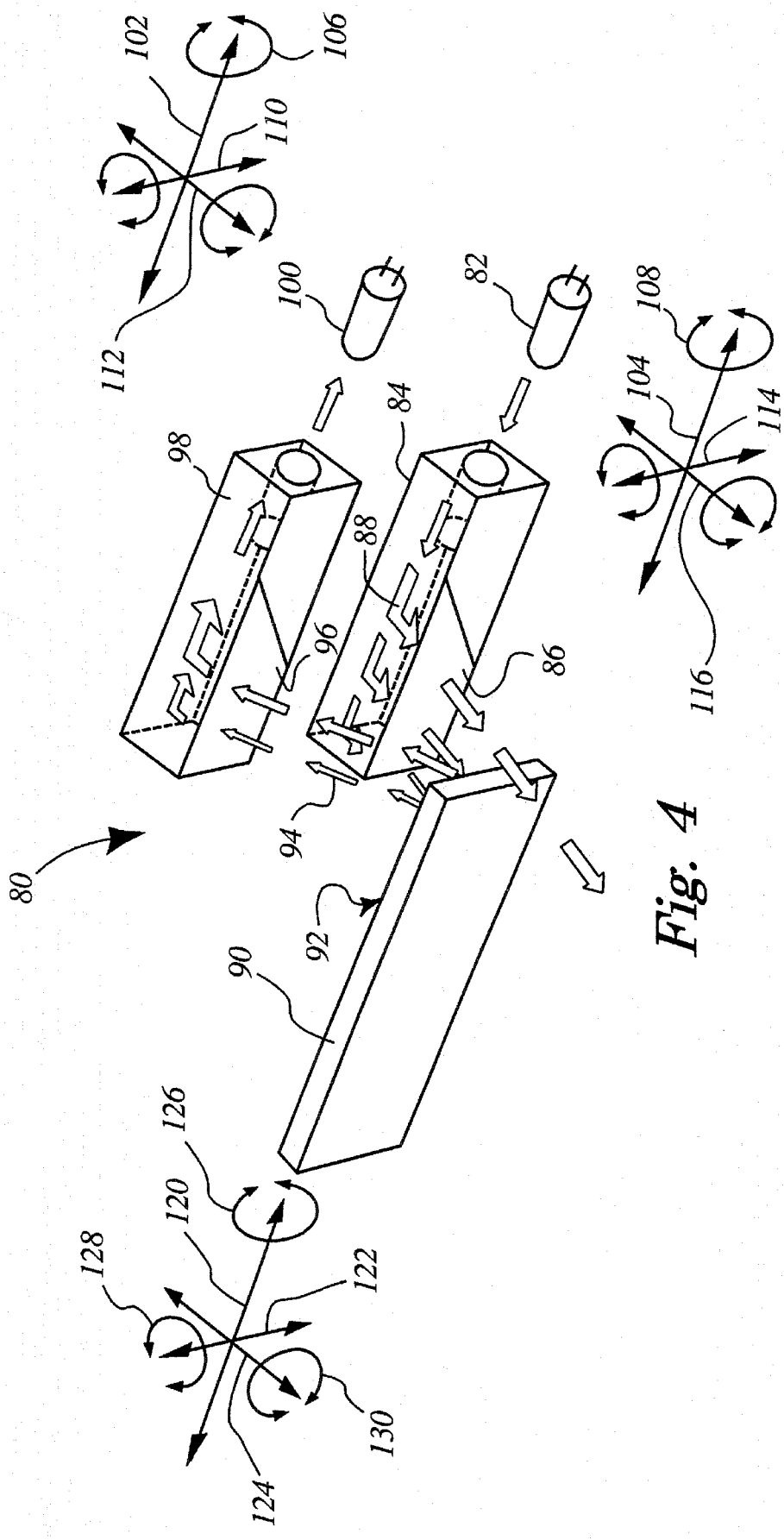
FIG. 4 is a schematic view of a reflective shadow sensor with light pipes movable and rotatable in various directions.

Turning now to FIG. 4, a further embodiment of the optical sensor is illustrated. The optical sensor 80 is shown to comprise a light source 82 mounted in a light transferring relationship with a light emitting pipe 84 which is formed with a translucent face 86 through which diffused light exits the light emitting pipe 84. The light travels through the light pipe 84 in the direction of arrows 88, such that the light is allowed to partially pass the reflective object 90 and partially bounce off the light impermeable surface 92 of the object 90. The reflected light travels in the direction of arrows 94 toward a diffusive surface 96 of a light receiving pipe 98 and travels through the light pipe 98 toward a light sensor 100. Except for the translucent faces 86 and 96, the remainder surfaces of the light pipes 84 and 98 are formed nontransparent to allow proper channeling of the light through the interior of the light pipes 84 and 98 from the light source 82 to the light sensor 100.

In the embodiment of FIG. 4, the light emitter pipe 84 and the light receiving pipe 98 are mounted for movement not only along their respective axes 102 and 104 but also rotate about these axes, as shown by arrows 106 and 108. The light pipe 84 and the light pipe 98 are further mounted for movement about their transverse axes in directions substantially perpendicular to the longitudinal axes 102 and 104. These directions are illustrated by arrows 110 and 112 for the light sensor 100, and by the arrows 114 and 116 for the light source 82. Additionally, both the light pipe 84 and the light pipe 98 are mounted for rotational movement about axes 114, 116 and axes 110 and 112, respectively. By mounting the light pipe 84 and the light pipe 98 for the alternative independent rotational and directional displacement, the output curve of the data can be amended, if desired.

It should be noted that the reflective object 90 can also move and rotate in various directional displacements, as shown by arrows 120, 122 and 124, as well as the directional rotational arrows 126, 128 and 130. Since the reflective object 90 forms no part of the present invention, its movements are dictated by the requirements of the industry where the light sensor 80 is designed to operate.

The embodiments of FIGS. 1–4 illustrate positioning of the light emitting pipes and the light receiving pipe in a spaced apart relationship with their respective surfaces aligned in a co-planar relationship to each other. Any displacement from the co-planar orientation of the diffusive surfaces will result in the change of the output received by the exterior computing means.

It is also envisioned that the light sensors and the light sources of the embodiments shown in FIGS. 1–3 can be mounted outside of the light pipes and be connected with them in a light transferring relationship.

Many other changes and modifications can be made in the design of the present invention without departing from the spirit thereof. I, therefore, pray that my rights to the present invention be limited only by the scope of the appended claims.

I claim:

1. An optical sensor, comprising:
a light emitting means for emitting a light flow, said light emitting means having a diffusive surface through which the light flow travels, said diffusive surface directing the light flow towards a light impermeable object;
a light receiving means for receiving the light flow emitted by the light emitting means and reflected by the light impermeable object mounted opposite said light emitting means and said light receiving means, said light receiving means being provided with a diffusive surface for directing the light flow received by said light receiving means.

2. The optical sensor of claim 1, wherein said light emitting means and said light receiving means are mounted in a spaced-apart relationship in such a manner that the diffusive surface of said light emitting means and the diffusive surface of said light receiving means are oriented in a substantially coplanar relationship.

3. The optical sensor of claim 1, wherein said light emitting means comprises a housing and a light source mounted in a light transferring relationship with said diffusive surface.

4. The optical sensor of claim 1, wherein said light receiving means comprises a body having a diffusive surface and a light sensor mounted in a light receiving relationship with said diffusive surface of said light receiving means.

5. The optical sensor of claim 3, wherein said light emitting means and said light receiving means are retained stationary during operation of the optical sensor.

6. An optical sensor, comprising:
a light emitting means for emitting a light flow, said light emitting means having a diffusive surface through which the light flow travels, said light emitting means comprising a housing and a light source mounted in a light transferring relationship with said diffusive surface, wherein said housing is mounted for rotational movement about its longitudinal axis; and
a light receiving means for receiving the light flow emitted by the light emitting means and reflected by a light impermeable object mounted opposite said light emitting means and said light receiving means.

7. An optical sensor, comprising:
a light emitting means for emitting a light flow, said light emitting means having a diffusive surface through which the light flow travels, said light emitting means comprising a housing and a light source mounted in a light transferring relationship with said diffusive surface, wherein said housing is mounted for rotational movement about its transverse axis; and
a light receiving means for receiving the light flow emitted by the light emitting means and reflected by a light impermeable object mounted opposite said light emitting means and said light receiving means.

8. An optical sensor, comprising:
a light emitting means for emitting a light flow, said light emitting means having a diffusive surface through which the light flow travels; and
a light receiving means for receiving the light flow emitted by the light emitting means and reflected by a light impermeable object mounted opposite said light emitting means and said light receiving means, said light receiving means comprising a body provided with a diffusive surface and a light sensor mounted in a light receiving relationship with said diffusive surface, and, wherein said body is mounted for rotational movement about its longitudinal axis.

9. An optical sensor, comprising:
a light emitting means for emitting a light flow, said light emitting means having a diffusive surface through which the light flow travels;
a light receiving means for receiving the light flow emitted by the light emitting means and reflected by a light impermeable object mounted opposite said light emitting means and said light receiving means, said light receiving means comprising a body provided with a diffusive surface and a light sensor mounted in a light receiving relationship with said diffusive surface, and, wherein said body is mounted for rotational movement about its transverse axis.

10. An optical sensor, comprising:
a light emitting means for emitting a light flow, said light emitting means having a diffusive surface through which the light flow travels, said light emitting means comprising a housing and a light source mounted in a light transferring relationship with said diffusive surface, wherein said housing is mounted for movement co-axial with a longitudinal axis of said housing;
a light receiving means for receiving the light flow emitted by the light emitting means and reflected by a light impermeable object mounted opposite said light emitting means and said light receiving means.

11. An optical sensor, comprising:
a light emitting means for emitting a light flow, said light emitting means having a diffusive surface through which the light flow travels, said light emitting means comprising a housing and a light source mounted in a light transferring relationship with said diffusive surface, wherein said housing is mounted for movement in a direction transverse to a longitudinal axis of said housing;
a light receiving means for receiving the light flow emitted by the light emitting means and reflected by a light impermeable object mounted opposite said light emitting means and said light receiving means.

12. An optical sensor, comprising:
a light emitting means for emitting a light flow, said light emitting means having a diffusive surface through which the light flow travels, said light emitting means comprising a housing and a light source mounted in a light transferring relationship with said diffusive surface, wherein said housing is mounted for movement in a direction perpendicular to a longitudinal axis of said housing; and a light receiving means for receiving the light flow emitted by the light emitting means and reflected by a light impermeable object mounted opposite said light emitting means and said light receiving means.

13. An optical sensor, comprising:

a light emitting means for emitting a light flow, said light emitting means having a diffusive surface through which the light flow travels;

a light receiving means for receiving the light flow emitted by the light emitting means and reflected by a light impermeable object mounted opposite said light emitting means and said light receiving means, said light receiving means comprising a body provided with a diffusive surface and a light sensor mounted in a light receiving relationship with said diffusive surface, and wherein said body is mounted for movement in a direction co-axial with the longitudinal axis of said body.

14. An optical sensor, comprising:

a light emitting means for emitting a light flow, said light emitting means having a diffusive surface through which the light flow travels;

a light receiving means for receiving the light flow emitted by the light emitting means and reflected by a light impermeable object mounted opposite said light emitting means and said light receiving means, said light receiving means comprising a body provided with a diffusive surface and a light sensor mounted in a light receiving relationship with said diffusive surface, and, wherein said body is mounted for movement in a direction transverse to a longitudinal axis of said body.

15. An optical sensor, comprising:

a light emitting means for emitting a light flow, said light emitting means having a diffusive surface through which the light flow travels;

a light receiving means for receiving the light flow emitted by the light emitting means and reflected by a light impermeable object mounted opposite said light emitting means and said light receiving means, said light receiving means comprising a body provided with a diffusive surface and a light sensor mounted in a light receiving relationship with said diffusive surface, said light receiving means, wherein said body is mounted for movement in a direction substantially perpendicular to a longitudinal axis of said body.

16. An optical sensor, comprising:

a light emitting means for emitting a light flow, said light emitting means having a diffusive surface through which the light flow travels, said diffusive surface directing the light flow towards a light impermeable object;

a light receiving means having a diffusive surface for receiving the light flow emitted by the light emitting means and reflected by the light impermeable object mounted opposite said light emitting means and said light receiving means, said diffusive surface of said light receiving means directing the light flow received by said light receiving means, and wherein said light emitting means and said light receiving means are mounted in a spaced-apart relationship to each other, such that their respective diffusive surfaces are oriented in a such a manner that they face one surface of said light impermeable object.

17. The optical sensor of claim 16, wherein said light emitting means comprises a housing and a light source mounted in a light transferring relationship with said diffusive surface.

18. The optical sensor of claim 16, wherein said light receiving means comprises a body and a light sensor mounted in a light receiving relationship with said diffusive surface of said light receiving means.

19. The optical sensor of claim 17, wherein said housing is retained stationary during operation of the optical sensor.

20. An optical sensor, comprising:

a light emitting means for emitting a light flow, said light emitting means having a diffusive surface through which the light flow travels, said light emitting means comprising a housing and a light source mounted in a light transferring relationship with said diffusive surface, wherein said housing is mounted for selective rotational movement about its longitudinal axis and its transverse axis;

a light receiving means having a diffusive surface for receiving the light flow emitted by the light emitting means and reflected by a light impermeable object mounted opposite said light emitting means and said light receiving means, and wherein said light emitting means and said light receiving means are mounted in a spaced-apart relationship to each other, such that their respective diffusive surfaces are oriented in such manner that they face one surface of said light impermeable object.

21. An optical sensor, comprising:

a light emitting means for emitting a light flow, said light emitting means having a diffusive surface through which the light flow travels;

a light receiving means having a diffusive surface for receiving the light flow emitted by the light emitting means and reflected by a light impermeable object mounted opposite said light emitting means and said light receiving means, wherein said light emitting means and said light receiving means are mounted in a spaced-apart relationship to each other, such that their respective diffusive surfaces are oriented in such manner that they face one surface of said light impermeable object, said light receiving means comprising a body and a light sensor mounted in a light receiving relationship with said diffusive surface of said light receiving means, and wherein said body is mounted for selective rotational movement about its longitudinal axis and its transverse axis.

22. An optical sensor, comprising:

a light emitting means for emitting a light flow, said light emitting means having a diffusive surface through which the light flow travels, said light emitting means comprising a housing and a light source mounted in a light transferring relationship with said diffusive surface, wherein said housing is mounted for movement co-axial with a longitudinal axis of said housing; and a light receiving means having a diffusive surface for receiving the light flow emitted by the light emitting means and reflected by a light impermeable object mounted opposite said light emitting means and said light receiving means, and wherein said light emitting means and said Light receiving means are mounted in a spaced-apart relationship to each other, such that their respective diffusive surfaces are oriented in such manner that they face one surface of said light impermeable object.

23. An optical sensor, comprising:

a light emitting means for emitting a light flow, said light emitting means having a diffusive surface through which the light flow travels, said light emitting means comprising a housing and a light source mounted in a light transferring relationship with said diffusive surface, wherein said housing is mounted for movement in a direction transverse to a longitudinal axis of said housing; and a light receiving means having a diffusive surface for receiving the light flow emitted by the light emitting means and reflected by a light impermeable object mounted opposite said light emitting means and said light receiving means, and wherein said light emitting means and said light receiving means are mounted in a spaced-apart relationship to each other, such that their respective diffusive surfaces are oriented in such manner that they face one surface of said light impermeable object.

24. An optical sensor, comprising:

a light emitting means for emitting a light flow, said light emitting means having a diffusive surface through which the light flow travels, said light emitting means comprising a housing and a light source mounted in a light transferring relationship with said diffusive surface, wherein said housing is mounted for movement in a direction substantially perpendicular to a longitudinal axis of said housing; and a light receiving means having a diffusive surface for receiving the light flow emitted by the light emitting means and reflected by a light impermeable object mounted opposite said light emitting means and said light receiving means, and wherein said light emitting means and said light receiving means are mounted in a spaced-apart relationship to each other, such that their respective diffusive surfaces are oriented in such manner that they face one surface of said light impermeable object.

25. An optical sensor, comprising:

a light emitting means for emitting a light flow, said light emitting means having a diffusive surface through which the light flow travels;

a light receiving means having a diffusive surface for receiving the light flow emitted by the light emitting means and reflected by a light impermeable object mounted opposite said light emitting means and said light receiving means, wherein said light emitting means and said light receiving means are mounted in a spaced-apart relationship to each other, such that their respective diffusive surfaces are oriented in such manner that they face one surface of said light impermeable object, said light receiving means comprising a body and a light sensor mounted in a light receiving relationship with said diffusive surface of said light receiving means, and wherein said body is mounted for movement in a direction co-axial with the longitudinal axis of said body.

26. An optical sensor, comprising:

a light emitting means for emitting a light flow, said light emitting means having a diffusive surface through which the light flow travels;

a light receiving means having a diffusive surface for receiving the light flow emitted by the light emitting means and reflected by a light impermeable object mounted opposite said light emitting means and said light receiving means, wherein said light emitting means and said light receiving means are mounted in a spaced-apart relationship to each other, such that their respective diffusive surfaces are oriented in such manner that they face one surface of said light impermeable object, said light receiving means comprising a body and a light sensor mounted in a light receiving relationship with said diffusive surface of said light receiving means, and wherein said body is mounted for movement in a direction transverse to a longitudinal axis of said body.

27. An optical sensor, comprising:

a light emitting means for emitting a light flow, said light emitting means having a diffusive surface through which the light flow travels;

a light receiving means having a diffusive surface for receiving the light flow emitted by the light emitting means and reflected by a light impermeable object mounted opposite said light emitting means and said light receiving means, wherein said light emitting means and said light receiving means are mounted in a spaced-apart relationship to each other, such that their respective diffusive surfaces are oriented in such manner that they face one surface of said light impermeable object, said light receiving means comprising a body and a light sensor mounted in a light receiving relationship with said diffusive surface of said light receiving means, and wherein said body is mounted for movement in a direction substantially perpendicular to a longitudinal axis of said body.

28. An optical sensor comprising:

a light emitting means for emitting a light flow;

a light receiving means for receiving the light flow emitted by the light emitting means and reflected by a light impermeable object mounted opposite said light emitting means and said light receiving means; and a means for directing a light flow towards said light impermeable object, said light directing means comprising a diffusive surface through which the light travels from said light emitting means.

29. The optical sensor of claim 28, wherein said light receiving means comprises a body having a light sensor and a light diffusive surface formed a distance from said light sensor, said diffusive surface directing the light flow towards said light sensor.

\* \* \* \* \*